(12) United States Patent
Currier et al.

(10) Patent No.: US 10,087,849 B2
(45) Date of Patent: Oct. 2, 2018

(54) RETENTION DEVICE FOR SPEED CHANGE MECHANISM IN A GAS TURBINE ENGINE

(71) Applicant: United Technologies Corporation, Farmington, CT (US)

(72) Inventors: Todd M. Currier, Enfield, CT (US); Brian P. Cigal, Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 364 days.

(21) Appl. No.: 15/094,132

(22) Filed: Apr. 8, 2016

(65) Prior Publication Data

US 2017/0292454 A1 Oct. 12, 2017

(51) Int. Cl.
| | |
|---|---|
| *F02C 7/36* | (2006.01) |
| *F16H 3/44* | (2006.01) |
| *F02C 7/20* | (2006.01) |
| *F16H 57/08* | (2006.01) |
| *F02K 3/06* | (2006.01) |
| *F16H 57/00* | (2012.01) |
| *F16H 57/02* | (2012.01) |

(52) U.S. Cl.
CPC .............. *F02C 7/36* (2013.01); *F02C 7/20* (2013.01); *F02K 3/06* (2013.01); *F16H 3/44* (2013.01); *F16H 57/082* (2013.01); *F05D 2260/40311* (2013.01); *F16H 2057/0081* (2013.01); *F16H 2057/02021* (2013.01)

(58) Field of Classification Search
CPC .. F16H 57/082; F16H 3/44; F16H 2057/0081; F16H 2057/02021; F16H 57/08; F02C 7/36; F02C 7/20; F02K 3/06; F05D 2260/40311
See application file for complete search history.

(56) References Cited

U.S. PATENT DOCUMENTS

| | | | |
|---|---|---|---|
| 3,459,072 | A | 8/1969 | Shannon |
| 4,092,878 | A | 6/1978 | Campbell |
| 7,752,836 | B2 | 7/2010 | Orlando et al. |
| 8,205,432 | B2 | 6/2012 | Sheridan |
| 8,517,670 | B1 | 8/2013 | Coffin et al. |
| 8,702,373 | B1 * | 4/2014 | Valva ..................... F01D 25/20 |
| | | | 415/111 |
| 8,708,863 | B2 | 4/2014 | McCune et al. |
| 8,894,538 | B2 | 11/2014 | McCune et al. |
| 8,931,285 | B2 | 1/2015 | McCune et al. |
| 2004/0255590 | A1 | 12/2004 | Rago et al. |
| 2005/0026745 | A1 | 2/2005 | Mitrovic |
| 2008/0171630 | A1 | 7/2008 | Madge et al. |
| 2011/0111917 | A1 | 5/2011 | Heitzenrater et al. |
| 2014/0366548 | A1 | 12/2014 | McCune |

OTHER PUBLICATIONS

Extended European Search Report for European Application No. 17165478.3 dated Aug. 10, 2017.

* cited by examiner

*Primary Examiner* — Richard Edgar
(74) *Attorney, Agent, or Firm* — Carlson, Gaskey & Olds, P.C.

(57) ABSTRACT

A gear system for a gas turbine engine includes a carrier that includes a first axial face. A plurality of gears are located in the carrier. An opening in the first axial face of the carrier is aligned with one of the plurality of gears. A housing includes a central cavity and is attached to the first axial face of the carrier. The housing includes an energy dissipating member.

20 Claims, 2 Drawing Sheets

RETENTION DEVICE FOR SPEED CHANGE MECHANISM IN A GAS TURBINE ENGINE

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The turbine section includes a drive turbine mechanically connected to the fan section through a speed change mechanism, such as a planetary gear system, to allow the drive turbine to rotate at a faster speed than the fan section. The variation in speed between the drive turbine and the fan section improves the efficiency of the gas turbine engine.

SUMMARY

In one exemplary embodiment, a gear system for a gas turbine engine includes a carrier that includes a first axial face. A plurality of gears are located in the carrier. An opening in the first axial face of the carrier is aligned with one of the plurality of gears. A housing includes a central cavity that is attached to the first axial face of the carrier. The housing includes an energy dissipating member.

In a further embodiment of the above, the plurality of gears are form a planetary gear system and the opening is aligned with a sun gear of the planetary gear system.

In a further embodiment of any of the above, the energy dissipating member at least partially extends into the central cavity.

In a further embodiment of any of the above, the energy dissipating member includes multiple undulations.

In a further embodiment of any of the above, the housing is made of a first material and the energy dissipating member is made of a second different material.

In a further embodiment of any of the above, at least one cavity is formed between the energy dissipating member and the housing.

In a further embodiment of any of the above, passages are in at least one of the housing and the energy dissipating member for releasing fluid from at least one cavity.

In a further embodiment of any of the above, at least one cavity includes an energy dissipating material different from the first material and the second material.

In a further embodiment of any of the above, the housing includes a radially outward extending flange adjacent the first axial face and a radially inward extending flange spaced from the first axial face. The energy dissipating member is located adjacent the radially inward extending flange.

In a further embodiment of any of the above, the housing is cylindrical and the central cavity includes a radius that has a first dimension. The opening in the first axial face includes a radius that has a second dimension. The first dimension is great than or equal to the second dimension.

In one exemplary embodiment, a gas turbine engine includes a speed change mechanism that includes a carrier that has a first axial face. An opening in the first axial face of the carrier is at least partially aligned with a gear located in the carrier. A housing includes a central cavity that is attached to the first axial face of the carrier. The housing includes an energy dissipating member. A spool is in mechanical communication with an input to the speed change mechanism. A fan drive shaft is in mechanical communication with an output of the speed change mechanism.

In a further embodiment of any of the above, the speed change mechanism includes a planetary gear system that has a plurality of gears. The opening in the first axial face is aligned with a sun gear of the planetary gear system.

In a further embodiment of any of the above, the energy dissipating member includes multiple undulations with cavities formed between the energy dissipating member and the housing.

In a further embodiment of any of the above, at least one passage is in at least one of the housing and the energy dissipating member for releasing fluid from at least one of the cavities.

In a further embodiment of any of the above, the housing is made of a first material and the energy dissipating member is made of a second different material. At least one of the cavities includes an energy dissipating material different from the first material and the second material.

In a further embodiment of any of the above, the housing includes a radially outward extending flange adjacent the first axial face. A radially inward extending flange is spaced from the first axial face and the energy dissipating member is located adjacent the radially inward extending flange.

In a further embodiment of any of the above, the housing is cylindrical and the central cavity includes a radius having a first dimension. The opening in the first axial face includes a radius that has a second dimension. The first dimension is greater than or equal to the second dimension.

In another exemplary embodiment, a method of retaining a gear in a speed change mechanism includes the steps of separating at least one gear from a speed change mechanism and dissipating energy from the gear with an energy dissipating member located in a housing attached to an axial face of the speed change mechanism.

In a further embodiment of any of the above, the method includes performing at least one of plastically deforming the energy dissipating member or controlling a release of a fluid to dissipate energy from the gear.

In a further embodiment of any of the above, the speed change mechanism is a planetary gear system that includes a carrier that has a first axial face. An opening in the first axial face of the carrier is at least partially aligned with the gear located in the carrier. The gear is a sun gear and the housing has a central cavity attached to the first axial face of the carrier. The housing includes the energy dissipating member.

DETAILED DESCRIPTION

Figure 1:
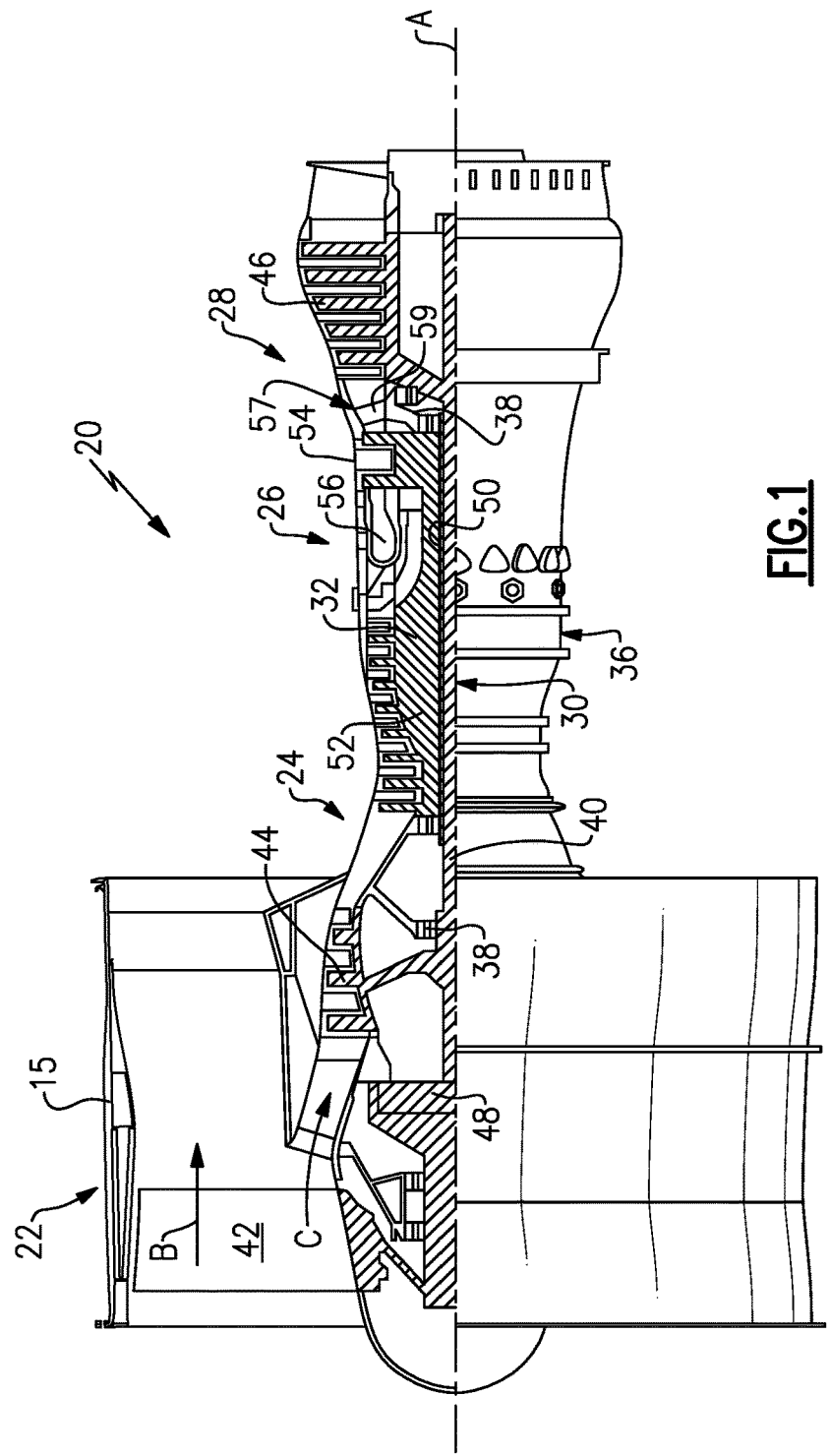
FIG. 1 is a schematic view of an example gas turbine engine according to a first non-limiting embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{ R})/(518.7° \text{ R})]^{0.5}$. The "Low corrected fan tip speed" as disclosed herein according to one non-limiting embodiment is less than about 1150 ft/second.

Figure 2:
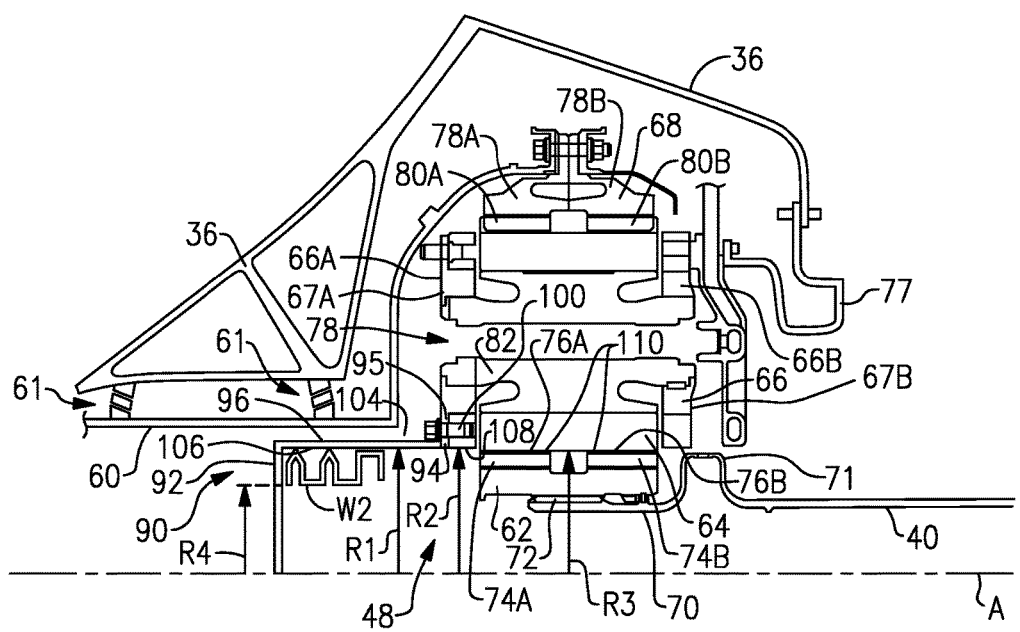
FIG. 2 is an enlarged schematic view of a portion of the gas turbine engine of FIG. 1.

As shown in FIG. 2, the geared architecture 48 is driven by an input from the inner shaft 40, which is driven by the low pressure turbine 46 (FIG. 1), to produce an output to drive a fan drive shaft 60, which drives the fan 42 (FIG. 1. The fan drive shaft 60 is supported by pair of bearings 61 attached to a portion of the engine static structure 36 and the fan drive shaft 60. In the illustrated non-limiting embodiment, the geared architecture 48 includes a sun gear 62, intermediate gears 64, a carrier 66, and a ring gear 68.

The sun gear 62 creates an input to the geared architecture 48 by forming a mechanical connection with the inner shaft 40 and the low pressure turbine 46. The mechanical connection includes at least one of a flexible input coupling 70 and a splined connection 72. The splined connection 72 allows for the transfer of rotational movement between the inner shaft 40 and the sun gear 62 without transferring axial loads into the geared architecture 48 from the low pressure turbine 46. The flexible input coupling 70 includes at least one undulation 71 to introduce a degree of flexibility into the flexible input coupling while still being able to transfer rotational movement from the inner shaft.

The sun gear 62 includes a forward set of teeth 74A and an aft set of teeth 74B. The forward and aft sets of teeth 74A, 74B form a v-shaped or herringbone pattern. The herringbone pattern functions to balance the load experienced between the forward and aft sets of teeth 74A, 74B in connecting the rotational input force from the low pressure turbine 46 and the counteracting force from driving the fan 42.

The intermediate gears 64 are located radially outward from the sun gear 62 and include a corresponding forward set of teeth 76A and aft set of teeth 76B that mate with the forward and aft sets of teeth 74A, 74B on the sun gear 62, respectively. In this disclosure, axial or axially is in relation to the engine axis A unless stated otherwise. The forward and aft sets of teeth 76A, 76B also include a corresponding v-shaped or herringbone pattern. The intermediate gears 64 are each attached to the carrier 66 by a separate journal bearing assembly 78.

The journal bearing assembly 78 includes a pin 82 that extends through the intermediate gear 64 and is supported on opposing axial ends by an axially forward portion 66A and an axially aft portion 66B of the carrier 66. The axially forward portion 66A includes an axially forward face 67A and the axially aft portion 66B includes an axially aft face 67B. The carrier 66 is fixed from rotational movement by a carrier flexible support 77. The carrier flexible support 77 introduces a degree of flexibility into the geared architecture to help maintain alignment of the components in the geared architecture during operation. Although the illustrated non-limiting embodiment shows a star gear system having the carrier 66 fixed from rotation, this disclosure will also apply to a planet gear system having the ring gear fixed from rotation with the carrier 66 allowed to rotate about the engine axis A.

In the illustrated embodiment, the ring gear 68 is located radially outward from the intermediate gears 64. The ring gear 68 is also a two piece ring gear and includes a forward portion 78A and an aft portion 78B that both form an output that is connected to the fan drive shaft 60. The forward portion 78A includes a forward set of teeth 80A and the aft portion 78B includes an aft set of teeth 80B. The forward and aft sets of teeth 80A, 80B include v-shaped or herring-bone pattern that mate with the forward and aft sets of teeth 78A, 78B on the intermediate gears 64.

In the illustrated embodiment, a housing 90, such as a retention housing, is attached to the axially forward face 67A of the carrier 66. In another embodiment, the housing 90 could be attached to the axially aft face 67B of the carrier 66. The housing 90 is cylindrical in shape defining a central cavity that extends along and is centered on the engine axis A. The housing 90 and the carrier 66 may be made of the same high strength material such as steel, titanium, or they could be made of different types of high strength materials.

The housing 90 includes an axially forward flange 92 and an axially aft flange 94. The axial forward flange 92 extends radially inward from a cylindrical body portion 96 of the housing 90 and the axially aft flange 94 extends radially outward from the cylindrical body portion 96. In one embodiment, both the axially forward and aft flanges 92, 94 extend circumferentially around the cylindrical body portion 96 and form a hoop. The axially aft flange 94 includes a plurality of fastener openings 95 to accept fasteners 100 for securing the housing 90 to the carrier 66. In another embodiment, the axially aft flange 94 may attach flush to the axially forward face 67A of the carrier 66 and in another embodiment, the axially forward face 67A of the carrier 66 may include a recessed portion to accept the axially aft flange 94. In yet another embodiment, the housing 90 could be conical and taper outward in a downstream direction such that the axially aft flange 94 need not extend radially outward.

In one embodiment, the cylindrical body 96 of the housing 90 includes a radially outer surface 104 and a radially inner surface 106. The radially inner surface 106 is spaced a distance R1 from the engine axis A, a radially innermost portion 108 of the carrier 66 is spaced a distance R2 from the engine axis A, and radially outermost portions 110 of the first and second set of teeth 74A and 74B on the sun gear 62 extend a distance R3 from the engine axis A. The radially innermost portion 108 forms an opening through the axially forward face 67A that is aligned with the sun gear 62. A similar opening with the same or similar radial dimension as the distance R2 is also formed in the axially aft face 67B and is also aligned with the sun gear 62. The openings in the axially forward and aft faces 67A, 67B allow the sun gear 62 to be inserted into the carrier 66 during assembly.

In the illustrated embodiment, the distance R2 is greater than the distance R3. This allows the sun gear 62 to fit through the opening defined by the radially innermost portion 108 of the carrier 66.

In the illustrated embodiment, the distance R1 to the radially inner surface 106 is equal to or greater than the distance R2 from the radially innermost portion 108 of the carrier 66 to the engine axis A and the distance R4 is less than the distance R3. In another embodiment, the distance R1 is greater than or equal to the distance R3. Both of these embodiments will allow the sun gear 62 to fit within the housing 90 but not move beyond an axially forward end of the housing 90 because the distance R4 from a radially inner portion of the axially forward flange 92 is smaller than the distance R3 of the sun gear 62.

An energy dissipating member 112 is located axially downstream of the axially forward flange 92, axially upstream of the axially aft flange 94, and radially inward from the radially inner surface 106. The energy dissipating material 112 is configured to engage the sun gear 62 should the sun gear 62 separate from the geared architecture 48 and move axially forward of the geared architecture 48. In the illustrated embodiment, the energy dissipating member 112 forms a continuous loop and in another embodiment, the energy dissipating member 122 includes segments surrounding the engine axis A.

During operation of the gas turbine engine 20, the individual gears in the geared architecture 48 transfer a significant load through the geared architecture 48 between the low pressure turbine 46 and the fan 42. In order to maintain alignment of the individual gears, the individual gears include sets of teeth having a v-shaped or herringbone pattern as described above. However, if there is a failure in the axially aft sets of teeth 74B, 76B, the angled herringbone pattern in the remaining axially forward sets of teeth 74A, 76A will force the sun gear 62 axially forward relative to the geared architecture 48 due to the opposing forces between the low pressure turbine 46 and the fan 42. The housing 90 will retain the sun gear 62 before the sun gear 62 enters the fan drive shaft 60 and the energy dissipating member 112 will dissipate the energy from the forward motion of the sun gear 62 through plastic deformation.

Similarly, if failure occurs in the axially forward sets of teeth 74A, 76A, the sun gear 62 would move axially aft. In this case, the housing 90 could be located adjacent the axially aft face 67B in addition to or in place of being located adjacent the axially forward surface 67A. The housing 90 and the energy dissipating member 112 will retain the sun gear 62 before it enters the gas turbine engine 20.

Figure 3:
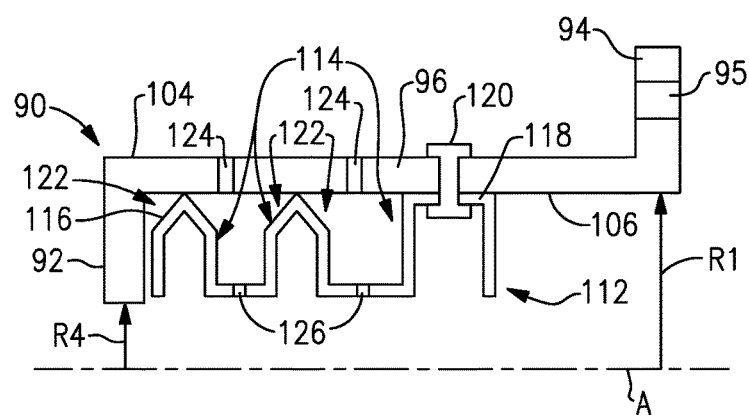
FIG. 3 is an enlarged schematic view of a non-limiting embodiment of a housing and an energy dissipating member.

As shown in FIG. 3, with continued reference to FIG. 2, the energy dissipating member 112 is located adjacent the axially forward flange 92 and the radially inner surface 106. The energy dissipating member 112 is made of a material with a low yield strength and high ductility, such as various alloys of stainless steel, aluminum, or nickel. The energy dissipating member 112 includes multiple undulations 114 that contribute to dissipating energy by encouraging deformation in predetermined locations. The undulations 114 can include various shapes, such as pointed distal ends 116, squared off distal ends 118, or distal ends having a curvature. The sequence of pointed distal ends 116, squared off distal ends 118, or distal ends with a curvature along the energy dissipating member 112 could be arranged in different orientations to achieve the desired amount of energy dissipation or to aid in securing the energy dissipating member 112 to the housing 90. Additionally, the undulations 114 could be directed radially inward instead of radially outward as illustrated in FIGS. 2 and 3. Alternatively, the energy dissipating member 112 would not include undulations but take another form which also relies on large plastic deformation of the member material to absorb energy.

Multiple approaches can be utilized to secure or adhere the energy dissipating member 112 relative to the housing 90. For example, the energy dissipating member 112 could be press fit into the body portion 96, secured to the body portion 96 with an adhesive, or mechanically attached with a mechanical device, such as a bolt 120 extending through the housing 90 and the energy dissipating member 112 as shown in FIG. 3. Although the bolt 120 is shown in an aft portion of the energy dissipating member 112, the bolt 120 could located in an axially forward portion or in an axially mid-portion of the energy dissipating member 112 to increase a distance between the bolt 120 and the sun gear 62.

The undulations 114 form cavities 122 between the energy dissipating member 112 and radially inner surface 106 of the housing 90. The cavities 122 could be filled with an energy dissipating material as well. The energy dissipating material could include a different material, such as an elastomer, from the energy dissipating member 112 and the material of the housing 90. The additional energy dissipating material in the cavities 122 would provide additional energy dissipation to the energy dissipating member 112. Alternatively, only one of the cavities could be filled with an additional energy dissipating material.

When the cavities 122 are empty, housing vents 124 extending through the housing 90 and/or member vents 126 extend through the energy dissipating member 112 could be used to allow for a fluid, such as air, in the cavities 122 to escape when the energy dissipating member 112 is compressed and plastically deforms. The housing vents 124 and the member vents 126 provide a passage to release pressure that would develop in the cavities 122 during deformation of the energy dissipating member. The displacement of the fluid can also dissipate energy through controlling the release of the fluid through the housing vents 124 and/or member vents 126.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gear system for a gas turbine engine comprising:
   a carrier including a first axial face;
   a plurality of gears located in the carrier;
   an opening in the first axial face of the carrier aligned with one of the plurality of gears; and
   a housing including a central cavity attached to the first axial face of the carrier, the housing including an energy dissipating member.

2. The gear system of claim 1, wherein the plurality of gears form a planetary gear system and the opening is aligned with a sun gear of the planetary gear system.

3. The gear system of claim 1, wherein the energy dissipating member at least partially extends into the central cavity.

4. The gear system of claim 3, wherein the energy dissipating member includes multiple undulations.

5. The gear system of claim 3, wherein the housing is made of a first material and the energy dissipating member is made of a second different material.

6. The gear system of claim 5, wherein at least one cavity is formed between the energy dissipating member and the housing.

7. The gear system of claim 6, including passages in at least one of the housing and the energy dissipating member for releasing fluid from the at least one cavity.

8. The gear system of claim 6, wherein the at least one cavity includes an energy dissipating material different from the first material and the second material.

9. The gear system of claim 1, wherein the housing includes a radially outward extending flange adjacent the first axial face and a radially inward extending flange spaced from the first axial face and the energy dissipating member is located adjacent the radially inward extending flange.

10. The gear system of claim 1, wherein the housing is cylindrical and the central cavity includes a radius having a first dimension, the opening in the first axial face includes a radius having a second dimension, and the first dimension is great than or equal to the second dimension.

11. A gas turbine engine comprising:
    a speed change mechanism including:
       a carrier having a first axial face;
       an opening in the first axial face of the carrier at least partially aligned with a gear located in the carrier;
       a housing including a central cavity attached to the first axial face of the carrier, the housing including an energy dissipating member; and
    a spool in mechanical communication with an input to the speed change mechanism;
    a fan drive shaft in mechanical communication with an output of the speed change mechanism.

12. The gas turbine engine of claim 11, wherein the speed change mechanism includes a planetary gear system having a plurality of gears and the opening in the first axial face is aligned with a sun gear of the planetary gear system.

13. The gas turbine engine of claim 11, wherein the energy dissipating member includes multiple undulations with cavities formed between the energy dissipating member and the housing.

14. The gas turbine engine of claim 13, including at least one passage in at least one of the housing and the energy dissipating member for releasing fluid from at least one of the cavities.

15. The gas turbine engine of claim 13, wherein the housing is made of a first material and the energy dissipating member is made of a second different material and at least one of the cavities includes an energy dissipating material different from the first material and the second material.

16. The gas turbine engine of claim 11, wherein the housing includes a radially outward extending flange adjacent the first axial face and a radially inward extending flange spaced from the first axial face and the energy dissipating member is located adjacent the radially inward extending flange.

17. The gas turbine engine of claim 11, wherein the housing is cylindrical and the central cavity includes a radius having a first dimension, the opening in the first axial face includes a radius having a second dimension, and the first dimension is greater than or equal to the second dimension.

18. A method of retaining a gear in a speed change mechanism comprising the steps of:
    separating at least one gear from a speed change mechanism; and
    dissipating energy from the gear with an energy dissipating member located in a housing attached to an axial face of the speed change mechanism.

19. The method of claim 18, including performing at least one of plastically deforming the energy dissipating member or controlling a release of a fluid to dissipate energy from the gear.

20. The method of claim 18, wherein the speed change mechanism is a planetary gear system including:
- a carrier having a first axial face;
- an opening in the first axial face of the carrier at least partially aligned with the gear located in the carrier, wherein the gear is a sun gear; and
- the housing having a central cavity attached to the first axial face of the carrier, the housing including the energy dissipating member.

* * * * *